Nov. 22, 1949  C. A. BABBITT  2,489,002

METHOD OF ELECTRIC ARC WELDING

Filed Nov. 2, 1946

WELDING CURRENT SOURCE

INVENTOR.
CHARLES A. BABBITT
BY Harold W. Mattingly
Attorney

Patented Nov. 22, 1949

2,489,002

UNITED STATES PATENT OFFICE 2,489,002

METHOD OF ELECTRIC ARC WELDING

Charles Albert Babbitt, South Gate, Calif., assignor, by mesne assignments, to Consolidated Western Steel Corporation, Los Angeles, Calif., a corporation of Delaware Application November 2, 1946, Serial No. 707,504

3 Claims. (Cl. 219—10)

My invention relates to electric arc welding and has particular reference to methods using both direct current electrodes and alternating current electrodes to obtain welds of superior quality which may be formed with great rapidity.

While my invention has general utility in the entire field of welding, it is particularly well adapted to the production of butt welds. Machines are commonly employed for making such welds and these machines usually employ welding rod material in coil form. This bare metallic electrode or rod is fed by power into the arc at a predetermined or automatically controlled speed. Such machines may be stationary and the workpieces fed past the machine, or the machine may be movable over stationary workpieces. A flux is generally used and may be supplied in granular form. The heat of the arc ordinarily melts the flux to form a pool of molten glass-like material that excludes oxygen and absorbs impurities. The arc discharge may take place within the pool and in this type of operation the arc is referred to as a submerged arc.

It is well known that an arc directed into the on-coming workpieces, i. e., a leading position or characteristic, gives a better weld than when the arc is at right angles to the workpieces or lags behind the electrode. A lagging arc, for example, often gives very poor results, probably due to the tendency of the arc to bore a hole into cold metal and thereby permit slag to enter the weld. Also in lagging arcs the pool of molten metal lags behind the discharge so that the arc acts on cold metal. This is in contrast to leading arcs wherein the pool of molten metal precedes the arc discharge. The leading arc therefore plays on a molten pool of metal and slag is accordingly excluded from the weld.

It is also known to be desirable in arc welding to use two arcs for depositing the desired amount of metal. Accordingly it is customary to make several welding passes over a single seam or joint being welded, depositing a certain desirable amount of welding metal at each pass. The reasons for several passes for a single weld are numerous and varied. The principal consideration is the amount of heat energy that can be absorbed in the localized area of the weld during the welding operation. If too much metal is deposited, the accompanying high heat results in a liquid pool of super-heated metal surrounded by relatively cold metal. The desired fusion and uniform intermixture of base and welding metal are often lacking in such over-heated welding operations. Also many fluxes break down at the high temperatures that accompany high energy welds and the fluxes perform poorly, if at all.

My invention utilizes the practice of plural passes over a single seam, but the first operation is so spaced from the second operation that a maximum utilization is made of the heat of the first welding operation. Accordingly welding speeds are greatly enhanced over standard practice by as much as 50 per cent and as much as 150 per cent over standard single electrode practice.

My invention accordingly embodies the use of a plurality of spaced arcs as just described, welding simultaneously on a single seam wherein at least one of the arcs has a leading characteristic. For example, two arcs may be utilized, the first of which (with respect to relative workpiece—electrode movement) may be leading in nature. While leading arcs have been produced heretofore by various mechanisms auxiliary to or foreign to the welding apparatus per se, I achieve the leading character of the first arc by the action of the second arc on the first arc. This inherent and self-contained action eliminates the need of external and auxiliary mechanisms for producing a leading arc.

In its more simple form my invention includes the use of a first electrode supplied with a selected amount of direct current energy, in combination with a second electrode supplied with a greater amount of alternating current energy. The action of the alternating current in the second electrode causes the arc of the direct current electrode to be leading in nature. The low energy first arc results in a clean, sound initial weld and this soundness of weld is enhanced by the leading character of the arc. A given time period is required for the heat of the liquid metal pool at the first arc to be radiated to the adjacent metal to bring this metal to a proper temperature for a final weld. The second electrode is spaced from the first electrode relative to the speed of the workpiece so that it acts on the weld at the optimum heat condition when the heat has penetrated the base metal but before the weld begins to cool as a whole. This permits the use of high energy in the second arc as the base metal is already heated and accordingly large amounts of metal may be soundly deposited in the second weld.

It is therefore a general object of my invention to provide improved welding apparatus and methods.

Another object of my invention is the provision of methods and apparatus whereby a direct current arc may precede an alternating current arc and thereby acquire a leading characteristic.

Still another object of my invention is the provision of methods and apparatus whereby multi-electrode welding may take place with a later electrode utilizing the heat generated by a preceding electrode.

Still a further object of my invention is the provision of a low energy, first, direct current arc of leading character operating simultaneously with a second alternating current arc of relatively high energy.

Other objects and advantages of my invention will be apparent in the following description and claims, considered together with the accompanying drawings, in which Fig. 1 is a schematic diagram of a stationary welding machine embodying my invention and past which workpieces may be automatically moved;

Figure 1:
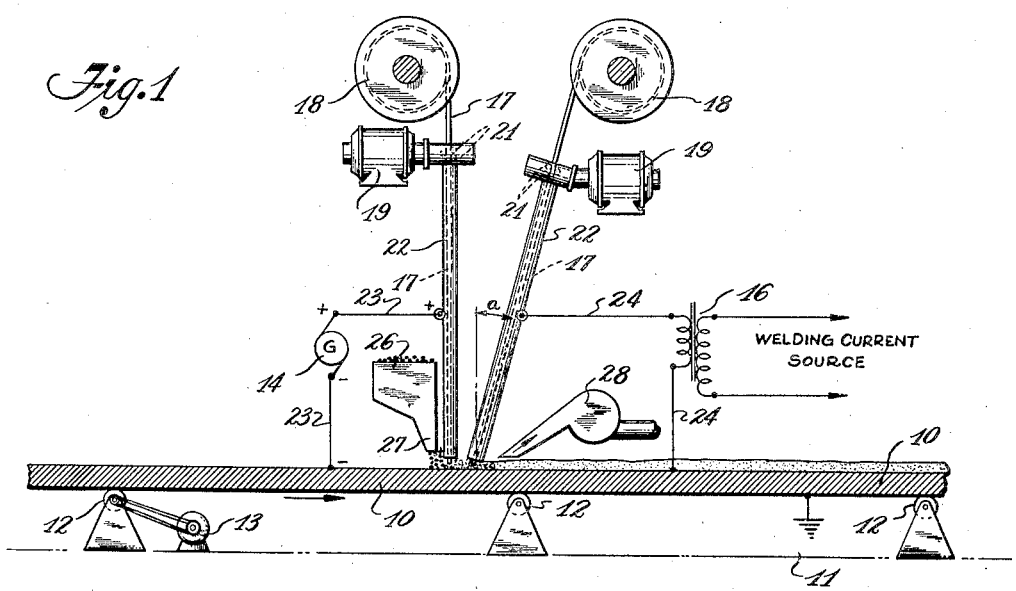

While any number of successive arcs may be employed utilizing the principles of my invention, I have illustrated a commercially operated embodiment wherein two arcs are employed, the first a direct current arc and the second an alternating current arc. Also I have illustrated apparatus wherein workpieces being welded are moved past the machine, although the invention is equally applicable to welding machines that move over stationary workpieces.

Referring to the drawings, a workpiece 10 may be supported by any suitable structure allowing it to move in a given direction such as a structure 11 including rollers 12 which may also include a motor 13 drivingly connected to one or more of the rollers for moving the workpiece 10. The welding apparatus per se may include a source 14 of direct current such as a D. C. generator and a source of alternating current such as a transformer 16. Welding rod material may be in the form of bare metal electrodes 17 stored in the form of coils 18 within a supporting framework (not shown). The electrodes 17 may be fed by power mechanism to the workpiece 10, which power mechanism may include motors 19 driving a plurality of knurled wheels 21 that grip each electrode. The electrodes 17 are preferably surrounded by guides 22, the lower part of which is preferably formed of a good electric conductor such as copper.

The source of direct current 14 may be suitably connected by conductors 23 to the leading electrode 17 and the workpiece so that the associated electrode 17 is positive with respect to the workpiece 10. Likewise the transformer 16 may have its secondary suitably connected between the other electrode 17 and the workpiece. Arc discharges accordingly take place between the ends of the electrodes 17 and the workpiece 10, causing the metal of the electrode to be deposited upon the workpiece 10 and as the electrode is consumed in this manner additional electrode metal is made available by the action of the motors 19 in feeding the electrodes downwardly toward the workpiece 10.

Welding apparatus may also include a hopper 26 filled with flux material preferably in granular form. The flux may be fed out of a spout 27 to maintain a pile of flux material on the seam at a sufficient depth to enclose the exposed ends of the electrodes 17 which project beyond their guides 22. The flux material becomes heated by the action of the arc and the major part thereof becomes a molten pool which surrounds the arcs and protects the heated metal deposited from the arcs, and when sufficiently cooled becomes a slag. The unmelted portions of the flux may be removed from the weld for re-use by a vacuum device 28 that sweeps the loose granules into a container.

The operation of the apparatus of my invention may be best described with reference to Figs. 2 and 3 wherein it will be noted that the workpiece 10 may consist of two illustrative workpieces 10a and 10b, the adjoining edges of which are preferably beveled as at 29 to assist in the formation of a sound weld. The first or leading electrode 17 (the one to the left in Fig. 2) sets up a direct current arc discharge 30 to the workpieces 10a and 10b, which discharge progressively fuses the electrode material, depositing it in the pool 31 of molten metal. The forward edge of such pool may be defined by a wall 32 of solidified welding metal, which forms due to the cooling action of the air and the adjoining metal upon the liquid pool 31. The entire discharge may take place in a pool 33 of molten flux material which is restrained on its sides projecting above the workpieces 10a and 10b by granular portions 34 of the flux which are not melted. This pool 33 of molten flux excludes all oxygen that would tend to oxidize the welding material and also absorbs impurities that might interfere with the soundness of the weld. The first weld takes place in the lower V-shaped portions of the joint between the two workpieces 10a and 10b and accordingly covers a relatively small volume.

The second or trailing electrode 17 sets up an alternating current arc 35 which progressively fuses the electrode 17, depositing it in molten form in a pool 36 which is retained on its forward end by a wall 37 of cooled metal. This second electrode deposits weld metal in the wide upper portions of the V-shaped joint between the workpieces 10a and 10b and accordingly deposits a large amount of metal compared with the first electrode although the depth of the liquid pool may be approximately the same. This alternating current arc also takes place within the molten pool 33 of flux material.

It should be noted that the first arc discharge 30, which is a direct current discharge, sets up its own magnetic field which circles about its electron and ion flow. This magnetic field may be illustrated by flux lines 38. The alternating current arc 35 also gives rise to a momentary magnetic field of one polarity during one-half of the cycle and to a magnetic field of opposite polarity during the other half of the cycle. Accordingly the magnetic field of the second arc 35 is constantly alternating and may be depicted by double-ended arrows 39. Alternate half-waves of the alternating magnetic field 39 have a demagnetizing effect upon the direct current magnetic field 38, particularly weakening the field in the portions nearest the alternating current arc 35. On such weakening of the direct current field 38 in this direction, the electron stream tends to migrate toward the center of density of the magnetic field 38 and accordingly is deflected away from the alternating magnetic field 39. Since the electron stream of the direct current arc 30 has one terminus at its associated electrode 17, this point is fixed with respect to the electron stream and the other end of the electron stream at the pool 31 is the movable end and accordingly is moved away from a second arc 35. This action results in the arc 30 curving into the on-coming workpieces 10a and 10b, which curvature is referred to as a leading arc.

This leading arc is in direct contrast to the lagging type of arc that would be present in the absence of a mechanism for causing it to assume a leading direction; for example, if there were no external magnetic fields present or other deflecting mechanisms, the direct current field 38 would penetrate the surrounding metal of the workpieces 10a and 10b. As these worpieces move relative to the electrode, the magnetic field induces eddy currents in the workpieces 10a and 10b and thus becomes weakened, particularly on its forward portion. The electron stream is then deflected rearwardly, causing the characteristic lagging arc found in ordinary welding practice.

From the foregoing it is evident that the use of a second alternating current arc in combination with a precedent direct current arc causes the latter to be leading in nature, resulting in a superior type of weld, as previously explained. This result is attributable to the leading character of the first arc and is not obtainable with either two alternating current arcs or two direct current arcs.

Figure 2:
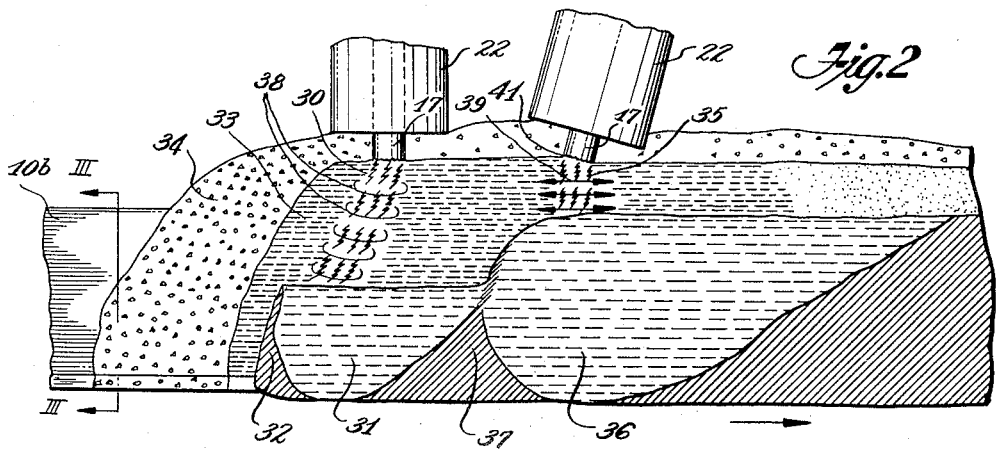
Fig. 2 is an enlarged elevation view of the arc portion of Fig. 1.
Figure 3:
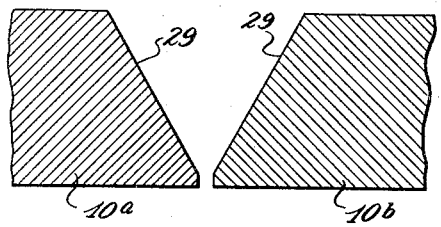
Fig. 3 is a sectional view along the line III—III of Fig. 2.

Referring still to the operation of the mechanism with respect to Fig. 2, it will be noted that as the workpiece moves in the direction of its arrow (moves to the right) the forward walls 32 and 37 of the two liquid pools will be fused by the liquid pools and new walls formed on the forward edge thereof. Likewise the forward wall of the molten pool of flux 33 will continually move forward and continue to enclose the arc.

The heat present in the first molten pool 31 will be radiated and conducted through the adjoining metal and after a suitable time period will raise this adjoining metal to a desired temperature. Accordingly the first pool 31 is of relatively small transverse section and the heat generated by the first arc is sufficient to properly fuse the small amount of weld material to the adjoining workpieces 10a and 10b. When the workpieces 10a and 10b have moved to the second electrode 17, the metal originally in the pool 31 may have solidified in transferring its heat to the surrounding metal. The second electrode 17 may deposit a large amount of metal due to the fact that the surrounding workpieces 10a and 10b are already at the desired temperature and there is no weakening of the weld which would otherwise result from having in effect a casting of weld metal on cold workpieces.

From the foregoing it will be apparent that there is a certain optimum spacing between the two electrodes 17. This will depend upon the speed with which the workpieces can conduct away the heat of the first liquid pool 31 and in turn become heated. This conduction of heat is somewhat a function of the thickness of the metal. Also the electrodes 17 cannot be too close together inasmuch as there will be in effect a single large arc which would result in the undesirable characteristics present when an arc is of too great an intensity and thus of too high an energy for the speed with which the workpiece moves. Also the spacing between the two electrodes should not be too great as the adjoining metal will have cooled too much and removed too much of the heat that is desirable.

Also the leading angle of the second electrode (as shown in Fig. 1) appears at present to have a beneficial effect. The disposition of the second electrode 17 at an angle a (Fig. 1) assists in maintaining a second electrode 17 clear of slag. By the time the pool of molten flux 33 has arrived at a second electrode 17 it is partially solidified and since the slag is a partial insulator when solid it would interfere with the operation of the arc. Accordingly therefore the end of the second electrode 17 is disposed at an angle as shown at 41, and the higher portion of this surface acts on the slag moving toward the electrode to melt the slag, giving a completely liquified flux for the main portion of the second electrode 17. This angle may be of any desired size, for example, from the range of 10° to 30°.

My invention has been successfully applied to the welding of three-eighths inch steel plates, resulting in a welding speed in the range of from 48 to 60 inches per minute, also experimental runs having been run as high as 100 inches per minute. In this particular welding application, the first electrode was supplied with direct current at 24 volts and 950 amperes and the second electrode was supplied with alternating current at 40 volts and 1050 amperes. The spacing between the electrodes could be varied from 2½ to 3 inches and still maintain good quality. As previously mentioned, the spacing, speed of the workpiece and energy of the arcs may be varied according to various circumstances such as diameter of the electrodes, thickness of metal, type of flux, type of electrode metal, temperature of metal being welded, etc.

While I have described my invention with respect to one illustrative embodiment thereof, I do not intend to limit my invention to this embodiment nor otherwise except by the terms of the following claims.

I claim:

1. In a method of welding together adjacent parallel edges of metal plate, the steps including causing relative movement between said edges and a pair of metal electrodes disposed in tandem and spaced along said edges, maintaining a direct-current arc between the leading electrode and said edges, thereby initially heating said edges and depositing fused electrode metal thereon, maintaining an alternating-current arc between the trailing electrode and said edges, thereby fusing said edges and depositing a second layer of fused electrode metal thereon, and correlating the spacing between electrodes and the energy of the arcs, respectively, so that the direct-current arc is blown to a leading position by the magnetic field of the alternating-current arc.

2. In a method of welding together adjacent parallel edges of metal plate, the steps including causing relative movement between said edges and a welding zone, in the direction of the edges, maintaining a direct-current arc between said edges and an electrode adjacent the entrance end of said zone, maintaining an alternating-current arc between said edges and an electrode spaced from the entrance end of said zone, and correlating the spacing between the electrodes and the energy of the arcs, respectively, to cause the direct-current arc to be blown to a leading position by the magnetic field of the alternating-current arc.

3. In a method of welding a seam between adjacent metal plate edges, the steps including causing relative movement between a direct-current arc and the edges longitudinally of the latter, and following up the direct-current arc so closely with an alternating-current arc that its magnetic field blows the direct-current arc to a leading position.

CHARLES ALBERT BABBITT.

REFERENCES CITED

The following references are of record in the file of this patent:

UNITED STATES PATENTS

| Number | Name | Date |
|---|---|---|
| 2,320,824 | Landis | June 1, 1943 |

FOREIGN PATENTS

| Number | Country | Date |
|---|---|---|
| 20,769 | Great Britain | Dec. 7, 1905 |